US012743202B2

(12) United States Patent
Wang et al.

(10) Patent No.: US 12,743,202 B2
(45) Date of Patent: Sep. 22, 2026

(54) IMAGE FEATURE OBTAINING METHOD AND ELECTRONIC DEVICE

(71) Applicant: HUAWEI TECHNOLOGIES CO., LTD., Shenzhen (CN)

(72) Inventors: Yaming Wang, Wuhan (CN); Jinfei Wang, Wuhan (CN); Yingwen Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 132 days.

(21) Appl. No.: 18/572,791

(22) PCT Filed: Apr. 6, 2022

(86) PCT No.: PCT/CN2022/085325
§ 371 (c)(1),
(2) Date: Dec. 21, 2023

(87) PCT Pub. No.: WO2022/267617
PCT Pub. Date: Dec. 29, 2022

(65) Prior Publication Data
US 2024/0290017 A1 Aug. 29, 2024

(30) Foreign Application Priority Data
Jun. 25, 2021 (CN) ........................ 202110713551.2

(51) Int. Cl.
*G06T 11/60* (2026.01)
*G06F 3/0354* (2013.01)
(Continued)

(52) U.S. Cl.
CPC .......... *G06T 11/60* (2013.01); *G06F 3/03545* (2013.01); *G06F 3/04883* (2013.01);
(Continued)

(58) Field of Classification Search
CPC ......... G06T 11/60; G06T 11/40; G06V 10/56; G06V 10/54; G06F 3/03545; G06F 3/04883
(Continued)

(56) References Cited

U.S. PATENT DOCUMENTS 10,282,055 B2 * 5/2019 Cherna ............... G06F 3/04845
10,930,033 B1 * 2/2021 Peterson .................. G06T 7/13
(Continued)

FOREIGN PATENT DOCUMENTS

CN 105242920 A 1/2016
CN 106033305 A 10/2016
(Continued)

*Primary Examiner* — David T Welch

(57) ABSTRACT

This application provides an image feature obtaining method and an electronic device, and relates to the field of terminal technologies. The method includes: A first device receives a first obtaining instruction. The first obtaining instruction indicates the first device to obtain an image feature. The first device obtains a first feature in response to the first obtaining instruction. The first feature is a feature of a first image of a target device, the target device is the first device or a second device associated with the first device, and the first image is at least a partial image in a picture currently displayed on a display of the target device. According to the technical solutions provided in this application, flexibility and diversity of obtained image features can be improved.

13 Claims, 9 Drawing Sheets

(51) Int. Cl.

| | |
|---|---|
| ***G06F 3/04883*** | (2022.01) |
| ***G06T 11/40*** | (2006.01) |
| ***G06V 10/54*** | (2022.01) |
| ***G06V 10/56*** | (2022.01) |

(52) U.S. Cl.
CPC .............. *G06T 11/40* (2013.01); *G06V 10/54* (2022.01); *G06V 10/56* (2022.01)

(58) Field of Classification Search
USPC .......................................................... 345/619
See application file for complete search history.

(56) References Cited

U.S. PATENT DOCUMENTS

| | | | | |
|---|---|---|---|---|
| 11,676,316 | B1 * | 6/2023 | Lopez | G06F 16/176<br>345/619 |
| 2002/0118210 | A1 * | 8/2002 | Yuasa | H04N 1/6052<br>345/589 |
| 2016/0357400 | A1 * | 12/2016 | Penha | G06F 3/04817 |
| 2017/0315772 | A1 | 11/2017 | Lee et al. | |
| 2019/0244409 | A1 * | 8/2019 | Ahn | G06V 40/161 |
| 2020/0076876 | A1 * | 3/2020 | Zhang | H04W 12/065 |
| 2021/0027510 | A1 * | 1/2021 | Avoyan | G11B 27/031 |
| 2022/0317824 | A1 * | 10/2022 | Lee | G06F 3/0481 |

FOREIGN PATENT DOCUMENTS

| | | | |
|---|---|---|---|
| CN | 109299310 | A | 2/2019 |
| CN | 111596848 | A | 8/2020 |
| WO | 2015043382 | A1 | 4/2015 |

* cited by examiner

IMAGE FEATURE OBTAINING METHOD AND ELECTRONIC DEVICE

CROSS-REFERENCE TO RELATED APPLICATIONS

This application is a national stage of International Application No. PCT/CN2022/085325, filed Apr. 6, 2022, which claims priority to Chinese Patent Application No. 202110713551.2, filed Jun. 25, 2021. Both of the aforementioned applications are hereby incorporated by reference in their entireties.

TECHNICAL FIELD

This application relates to the field of terminals, and in particular, to an image feature obtaining method and an electronic device.

BACKGROUND

With continuous development of electronic device technologies, functions of electronic devices are gradually improved. Through image-text editing functions, for example, handwriting or drawing, a user can write texts or draw images on screens of electronic devices, so that the user can record information or create works of art. In a process of using the foregoing image-text editing functions, the user may need brushes of specific colors, or need to draw specific textures. Correspondingly, the electronic device needs to provide image features, for example, the color or the texture, for the user.

In a conventional technology, the electronic device may provide a preset image feature library for the user, and the image feature library may include a plurality of preset image features. When receiving a selection operation by the user on any image feature, the electronic device determines that the image feature is selected by the user, and then may perform subsequent operations, for example, image-text editing, based on the image feature selected by the user.

However, the image features included in the preset image feature library are usually very limited. Take a color feature as an example. The electronic device may provide the user with only several common options for the color feature, which may however change infinitely. Therefore, it is clear that the conventional technology has a large limitation on providing the image features, and cannot meet user requirements.

SUMMARY

In view of this, this application provides an image feature obtaining method and an electronic device, to improve flexibility and diversity of obtained image features.

To achieve the foregoing objective, according to a first aspect, an embodiment of this application provides an image feature obtaining method, including:

A first device receives a first obtaining instruction, where the first obtaining instruction indicates the first device to obtain an image feature; and the first device obtains a first feature in response to the first obtaining instruction. The first feature is a feature of a first image of a target device, the target device is the first device or a second device associated with the first device, and the first image is at least a partial image in a picture currently displayed on a display of the target device.

The image feature is a visual feature of an image, and the image feature may be used to edit a text or an image. When the text or the image is edited based on the image feature, the text or the image may be enabled to have the image feature.

It should be noted that, that the first device is associated with the second device may mean that the first device is being connected to or can be connected to the second device through communication. In some embodiments, the first device and the second device may be devices currently connected by using a short-range communication technology. In some other embodiments, the first device and the second device may be devices corresponding to a same user identifier. For example, the first device may be a tablet computer of a user A, and the second device may be a mobile phone of the user A.

In embodiments of this application, if the first device receives the first obtaining instruction that indicates to obtain the image feature, the first device may obtain the first feature. The first feature is the feature of the first image of the target device, the target device may be the first device, or may be the second device associated with the first device, and the first image may be at least a partial image of the picture currently displayed on the display of the target device. Content of the picture comes from a wide range of sources, and may be an interface of an application in the target device, or may be a superposition of interfaces of a plurality of applications in the target device. For example, the picture may be a frame of picture in a video that is being played, or may be a list of a plurality of photos included in the album. Therefore, the first image is not limited by an application or the first device, and the first features that may be included in the first image are very flexible and diversified. This greatly improves flexibility and diversity of obtained image features, and fully meets a user requirement.

Optionally, the first feature may be a feature of a color type or a feature of a texture type.

Optionally, the target device is the first device. That the first device obtains a first feature in response to the first obtaining instruction includes:

The first device obtains, based on a first screen capture operation, the first image from the picture currently displayed on the display of the first device; and the first device extracts the first feature from the first image.

The first image is at least a partial image of the picture currently displayed on the display of the first device, the picture is not limited by an application, and correspondingly, the first image is not limited by an application in the first device. Therefore, the first feature can be obtained from a source outside a preset image feature library, for example, an area outside an interface of an image-text editing application. Therefore, flexibility and diversity of obtained image features are improved, and a user requirement can be fully met. In addition, in comparison with a manner in which a user uploads the image feature to the first device from outside the first device, an operation is simpler.

Optionally, before the first device obtains, based on the first screen capture operation, the first image from the picture currently displayed on the display of the first device, the method further includes:

The first device creates a first window according to the first obtaining instruction, where a size of the first window is the same as a size of the display of the first device, and the first window is a transparent window located over another window displayed on the display.

That the first device obtains, based on a first screen capture operation, the first image from the picture currently displayed on the display of the first device includes:

If the first device receives the first screen capture operation on the first window, the first device obtains the first image from the picture currently displayed on the display of the first device.

After the first device obtains, based on the first screen capture operation, the first image from the picture currently displayed on the display of the first device, the method further includes:

The first device closes the first window.

The display of the first device may include a plurality of windows such as a second window and a third window, and the windows may belong to different applications. For example, a window of a drawing application may be displayed on the left side of the display, and a window of an album may be displayed on a right side of the display. Therefore, to avoid confusion between an operation of obtaining the first image by the first device and another operation (for example, an operation on the album), and improve reliability of obtaining the first image, the first device may create the first window.

The foregoing interface including the plurality of windows such as the second window and the third window jointly form the picture currently displayed on the display of the second device.

It should be noted that transparency of the first window may be obtained by the first device by receiving, in advance, a submission by a related person skilled in the art, or may be obtained by receiving a submission by the user before the first window is created.

Optionally, the transparency of the first window may be 100%. Certainly, in actual application, the transparency of the first window may be another value. The transparency of the first window is not specifically limited in embodiments of this application.

Optionally, that the first device obtains, based on a first screen capture operation, the first image from the picture currently displayed on the display of the first device includes:

The first device determines a first closed area on the display of the first device based on the first screen capture operation; and the first device obtains the first image based on the first closed area.

Optionally, that the first device determines a first closed area on the display of the first device based on the first screen capture operation includes:

The first device determines a first position based on the first screen capture operation, and determines an area in a first frame at the first position as the first closed area, where the first frame is a preset frame; or if the first screen capture operation is a sliding operation, the first device determines, as the first closed area, a closed area formed by a sliding track of the sliding operation.

The user may flexibly and accurately obtain the first image in any size or any shape by sliding on the display. Certainly, only the first position of the first closed area may be specified, and then the first closed area and the first image are quickly determined with reference to the first frame of a preset shape and size. This can also reduce difficulty in obtaining the first image.

In some embodiments, the first closed area may be a maximum closed area or a minimum closed area formed by the sliding track.

It should be noted that, if the sliding track of the sliding operation does not form the closed area, a head and a tail of the sliding track may be connected to obtain a closed area.

It should be further noted that the first frame (including the size and the shape) may be determined through presetting. In some embodiments, the first device may provide a plurality of different frames for the user in advance, and when receiving a selection operation by the user on any frame, determine the frame as the first frame. The size, the shape, and a setting manner of the first frame are not specifically limited in embodiments of this application.

Optionally, that the first device obtains the first image based on the first closed area includes:

The first device captures the first image in the first closed area from the picture currently displayed on the display of the first device; or the first device captures, as a second image, the picture currently displayed on the display of the first device, and crops the second image based on the first closed area, to obtain the first image.

The first image is determined based on the first closed area, and may include less image data than the second image, so that data to be analyzed for subsequently extracting a first feature is less and the extracted first feature is more accurate. This can improve efficiency and accuracy of obtaining the first feature. Certainly, in actual application, the second image may also be obtained for subsequently obtaining the first feature.

Optionally, the target device is the second device. That the first device obtains a first feature in response to the first obtaining instruction includes:

The first device sends a first obtaining request to the second device, where the first obtaining request corresponds to the first obtaining instruction, and the first obtaining request requests to obtain an image feature from the second device; and the first device receives the first feature fed back by the second device.

The first image is at least a partial image in a picture currently displayed on a display of the second device, the picture is not limited by an application, and correspondingly, the first image is not limited by the first device. Therefore, the first device can obtain the first feature from the second device other than the first device. This further improves flexibility and diversity of obtained image features, and fully meets a user requirement. For example, the user may apply a color or texture of a photo in an album of a mobile phone to a drawing application of a tablet computer.

The first device may communicate with the second device through a distributed data exchange channel.

In some embodiments, the first obtaining request may further carry a target feature type.

Optionally, the target device is the second device. That the first device obtains a first feature in response to the first obtaining instruction includes:

The first device sends a second obtaining request to the second device, where the second obtaining request corresponds to the first obtaining instruction, and the second obtaining request requests to obtain an image from the second device;

the first device receives the first image fed back by the second device; and the first device extracts the first feature from the first image.

Optionally, before the first device obtains the first feature in response to the first obtaining instruction, the method further includes:

The first device receives a first setting instruction, where the first setting instruction indicates that the target device is the first device; or the first device receives a second setting instruction, where the second setting instruction indicates that the target device is the second device.

It should be noted that the first device may also determine, in another manner, that the target device is the first device or the second device, or the first device may be configured to obtain the image feature only from the first device or the second device, so that there is no need to determine whether the target device is the first device or the second device.

Optionally, before the first device obtains the first feature in response to the first obtaining instruction, the method further includes:

The first device receives a third setting instruction, where the third setting instruction indicates to obtain a target feature type of the image feature.

That the first device obtains a first feature in response to the first obtaining instruction includes:

The first device obtains the first feature based on the target feature type.

Optionally, the target feature type includes a color type or a texture type.

In other words, if the user specifies the target feature type, the first device may accurately extract the first feature of the target feature type from the first image. However, in some other embodiments, if the user does not specify the target feature type, the first device may process the first image based on at least one feature type, to obtain at least one type of first feature.

Optionally, the method further includes:

The first device receives a third obtaining request of an associated third device, where the third obtaining request requests to obtain an image feature from the first device:

the first device obtains a third image, where the third image is at least a partial image in the picture currently displayed on the display of the first device;

the first device obtains a second feature from the third image; and the first device feeds back the second feature to the third device.

The first device may also be used as a provider of the image feature, to provide the second feature for the associated third device. In addition, in some embodiments, the first device may send the third image to the third device. Correspondingly, the third device processes the third image to obtain the second feature.

Optionally, the first device performs an image-text editing operation based on the first feature.

An image-text editing operation may be performed. The first device may perform the image-text editing operation in an image-text editing application based on the first feature, to apply the first feature to a new text or image, so that a text or an image obtained after the operation has the first feature.

In some embodiments, the first device may add the obtained first feature to an image feature library, for example, a built-in palette or a built-in texture image library, so that the user can directly obtain the first feature from the image feature library, for example, the built-in palette or the built-in texture image library next time.

In some embodiments, the first device or the second device may not obtain the first feature from the first image, but directly copy the first image to the image-text editing application.

According to a second aspect, an embodiment of this application provides an image feature obtaining method, including:

A second device receives a first obtaining request sent by a first device, where the first obtaining request requests to obtain an image feature from the second device:

the second device obtains a first image, where the first image is at least a partial image of a picture currently displayed on a display of the second device;

the second device extracts the first feature from the first image; and the second device feeds back the first feature to the first device.

Optionally, that the second device obtains a first image includes:

The second device obtains, based on a first screen capture operation, the first image from the picture currently displayed on the display of the second device.

Optionally, before the second device obtains, based on the first screen capture operation, the first image from the picture currently displayed on the display of the second device, the method further includes:

The second device creates a first window based on the first obtaining request. A size of the first window is the same as a size of the display of the second device, and the first window is a transparent window located over another window displayed on the display.

That the second device obtains, based on a first screen capture operation, the first image from the picture currently displayed on the display of the second device includes:

If the second device receives the first screen capture operation on the first window, the second device obtains the first image from the picture currently displayed on the display of the first device.

After the second device obtains, based on the first screen capture operation, the first image from the picture currently displayed on the display of the second device, the method further includes:

The second device closes the first window.

Optionally, that the second device obtains, based on a first screen capture operation, the first image from the picture currently displayed on the display of the second device includes:

The second device determines a first closed area on the display of the second device based on the first screen capture operation; and the second device obtains the first image based on the first closed area.

Optionally, that the second device determines a first closed area on the display of the second device based on the first screen capture operation includes:

The second device determines a first position based on the first screen capture operation, and determines an area in a first frame at the first position as the first closed area, where the first frame is a preset frame; or if the first screen capture operation is a sliding operation, the second device determines, as the first closed area, a closed area formed by a sliding track of the sliding operation.

Optionally, that the second device obtains the first image based on the first closed area includes: The second device captures the first image in the first closed area from the picture currently displayed on the display of the second device; and the second device captures, as a second image, the picture currently displayed on the display of the second device, and crops the second image based on the first closed area, to obtain the first image.

In some embodiments, when receiving the second obtaining request sent by the first device, the second device may obtain the first image and feed back the first image to the first device, and the first device extracts the first feature from the first image.

According to a third aspect, an embodiment of this application provides an image feature obtaining apparatus. The apparatus may be disposed in an electronic device, and the apparatus may be configured to perform the method according to any one of the first aspect and/or any one of the second aspect.

Optionally, the apparatus may include a hand-drawing brush engine module. The hand-drawing brush engine module may be configured to perform interaction between the electronic device and a user, for example, trigger the electronic device to obtain an image feature according to the method provided in embodiments of this application.

Optionally, the apparatus may include a window management service module. The window management service module may be configured to manage a life cycle of each window in the electronic device, detect a touch event for each window, and the like. For example, the electronic device may create and close a first window by using the window management service module.

Optionally, the apparatus may include a layer composition module. The layer composition module may be configured to composite obtained pictures of a plurality of windows into one image, and therefore may be configured to obtain a first image or a second image.

Optionally, the apparatus may include a distributed task scheduling module. The distributed task scheduling module may be used by the electronic device to invoke a service from another device through a distributed data exchange channel.

According to a fourth aspect, an embodiment of this application provides an electronic device, including a memory and a processor. The memory is configured to store a computer program, and the processor is configured to perform the method according to any one of the first aspect and/or any one of the second aspect when invoking the computer program.

According to a fifth aspect, an embodiment of this application provides a chip system. The chip system includes a processor, the processor is coupled to a memory, and the processor executes a computer program stored in the memory, to implement the method according to any one of the first aspect and/or any one of the second aspect.

The chip system may be a single chip or a chip module including a plurality of chips.

According to a sixth aspect, an embodiment of this application provides a computer-readable storage medium. The computer-readable storage medium stores a computer program. When the computer program is executed by a processor, the method according to any one of the first aspect and/or any one of the second aspect is implemented.

According to a seventh aspect, an embodiment of this application provides a computer program product. When the computer program product runs on an electronic device, the electronic device is enabled to perform the method according to any one of the first aspect and/or the second aspect.

It may be understood that, for beneficial effects of the second aspect to the seventh aspect, refer to related descriptions in the first aspect. Details are not described herein again.

DESCRIPTION OF EMBODIMENTS

An image feature obtaining method provided in embodiments of this application may be applied to an electronic device, for example, a mobile phone, a tablet computer, a wearable device, a vehicle-mounted device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
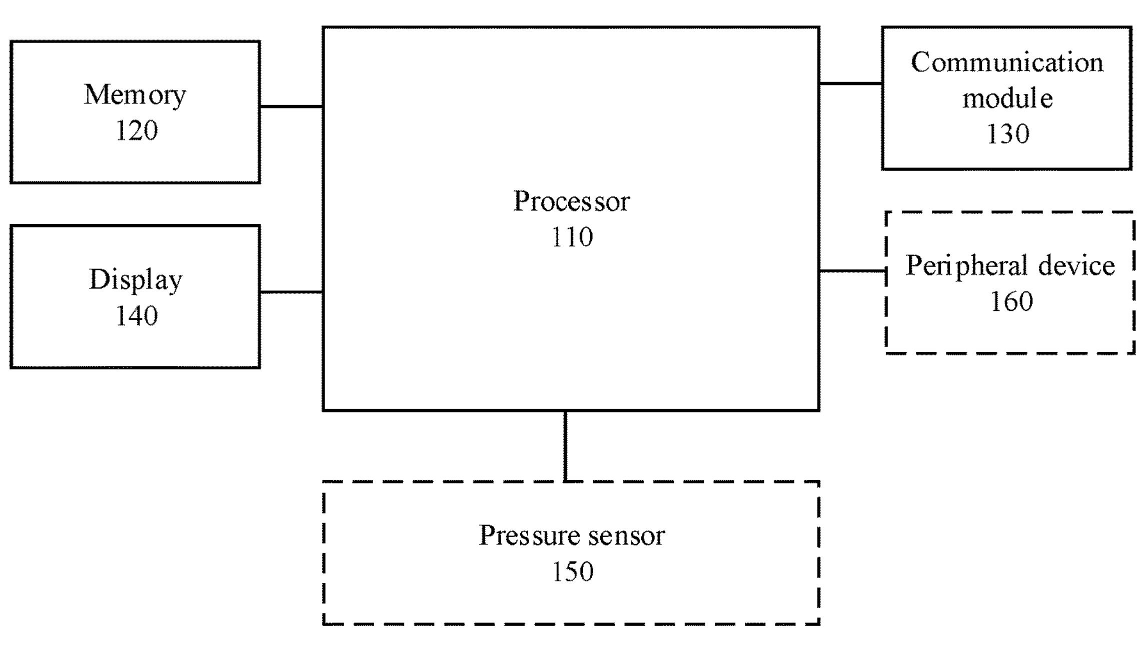
FIG. 1 is a schematic diagram of a structure of an electronic device according to an embodiment of this application.

FIG. 1 is a schematic diagram of a structure of an electronic device 100 according to an embodiment of this application. The electronic device 100 may include a processor 110, a memory 120, a communication module 130, a display 140, and the like.

The processor 110 may include one or more processing units, and the memory 120 is configured to store program code and data. In embodiments of this application, the processor 110 may execute computer-executable instructions stored in the memory 120, and the processor 110 is configured to control and manage an action of the electronic device 100.

The communication module 130 may be configured to: perform communication between internal modules of the electronic device 100, or perform communication between the electronic device 100 and another external electronic device, or the like. For example, if the electronic device 100 communicates with another electronic device in a wired connection manner, the communication module 130 may include an interface, for example, a USB interface. The USB interface may be an interface that complies with a USB standard specification, and may be a mini USB interface, a micro USB interface, a USB Type C interface, or the like. The USB interface may be configured to connect to a charger to charge the electronic device 100, or may be configured to perform data transmission between the electronic device 100 and a peripheral device, or may be configured to connect to a headset, to play audio by using the headset. The interface may be further configured to connect to another electronic device, for example, an AR device.

Alternatively, the communication module 130 may include an audio component, a radio frequency circuit, a Bluetooth chip, a wireless fidelity (wireless fidelity, Wi-Fi) chip, a near-field communication (near-field communication, NFC) module, and the like. The communication module 130 may perform interaction between the electronic device 100 and the another electronic device in a plurality of different manners.

The display 140 may display an image, a video, or the like on a human-computer interaction interface.

Optionally, the electronic device 100 may further include a pressure sensor 150, configured to sense a pressure signal, and may convert the pressure signal into an electrical signal. In some embodiments, the pressure sensor 150 may be disposed on the display. There are a plurality of types of pressure sensors 150, such as a resistive pressure sensor, an inductive pressure sensor, and a capacitive pressure sensor. The capacitive pressure sensor may include at least two parallel plates made of conductive materials. When a force is applied to the pressure sensor, capacitance between electrodes changes. The electronic device 100 determines pressure intensity based on the change in the capacitance. When a touch operation is performed on the display, the electronic device 100 detects intensity of the touch operation through the pressure sensor 150. The electronic device 100 may also calculate a touch position based on a detection signal of the pressure sensor 150. In some embodiments, touch operations that are performed in a same touch position but have different touch operation intensity may correspond to different operation instructions. For example, when a touch operation whose touch operation intensity is less than a first pressure threshold is performed on a messaging application icon, an instruction for viewing an SMS message is executed. When a touch operation whose touch operation intensity is greater than or equal to the first pressure threshold is performed on the messaging application icon, an instruction for creating a new SMS message is performed.

Optionally, the electronic device 100 may further include a peripheral device 160, for example, a mouse, a keyboard, a loudspeaker, a microphone, or a stylus.

It should be understood that, in addition to various components or modules shown in FIG. 1, the structure of the electronic device 100 is not specifically limited in embodiments of this application. In some other embodiments of this application, the electronic device 100 may further include more or fewer components than those shown in the figure, some components may be combined, some components may be split, or different component arrangements may be used. The components shown in the figure may be implemented by using hardware, software, or a combination of software and hardware.

Figure 2:
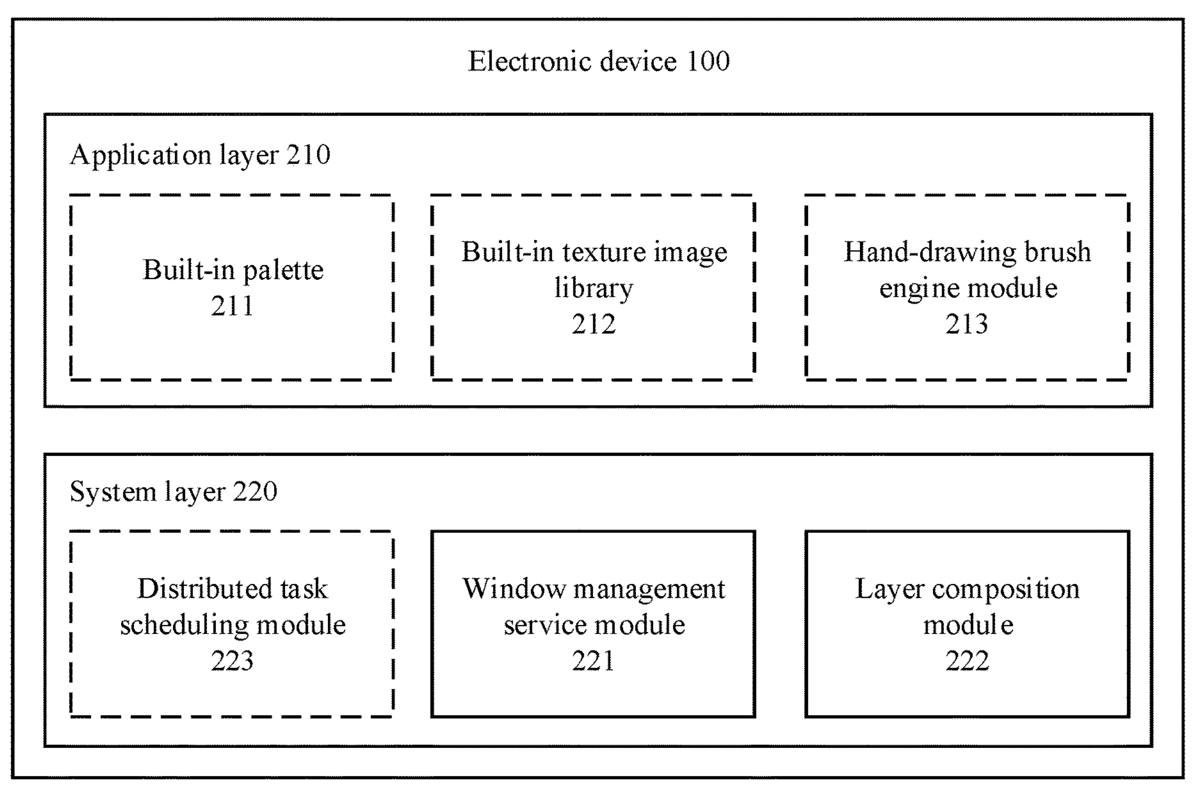
FIG. 2 is a block diagram of a software structure of an electronic device according to an embodiment of this application.

A software system of the electronic device 100 may use a layered architecture, an event-driven architecture, a microkernel architecture, a micro service architecture, or a cloud architecture. FIG. 2 is a block diagram of a software structure of the electronic device 100 according to an embodiment of this application. The electronic device 100 may include an application layer 210 and a system layer 220.

The application layer 210 may include a series of application packages. In some embodiments, the application package may include an image-text editing application, for example, a document editing application and a drawing application. The image-text editing application may be used to edit a text or an image, for example, generate a text, modify a text style, or draw an image.

In some embodiments, the application layer 210 may include a built-in palette 211 and a built-in texture image library 212. The built-in palette 211 may include a plurality of preset color features. The built-in texture image library 212 may include a plurality of texture features that are preset or that are uploaded by a user in advance.

In some embodiments, the application layer 210 may include a hand-drawing brush engine module 213. The hand-drawing brush engine module 213 may be configured to perform interaction between the electronic device 100 and the user, for example, trigger the electronic device 100 to obtain an image feature according to the method provided in embodiments of this application.

The system layer 220 may include a window management service module 221 and a layer composition module 222.

The window management service module 221 may be configured to manage a life cycle of each window in the electronic device 100, detect a touch event for each window, and the like. The touch event may include touch coordinates, a pressure value, and the like.

The layer composition module 222 may be configured to composite obtained pictures of a plurality of windows into one image.

In some embodiments, the system layer 220 may further include a distributed task scheduling module 223. The distributed task scheduling module 223 may be configured for the electronic device 100 to invoke a service from another device through a distributed data exchange channel.

In some embodiments, the system layer 220 may further include an image drawing module. The image drawing module may be configured to draw an image on the display 140.

An image-text editing function is an important function of the electronic device. The user may edit a text or an image on the electronic device by using the image-text editing function. In a process of editing the text or the image, the user usually performs personalized processing on the text or the image, for example, setting the text or the image to a specific color, or drawing a specific texture in an area of the text or the image.

Figure 3:
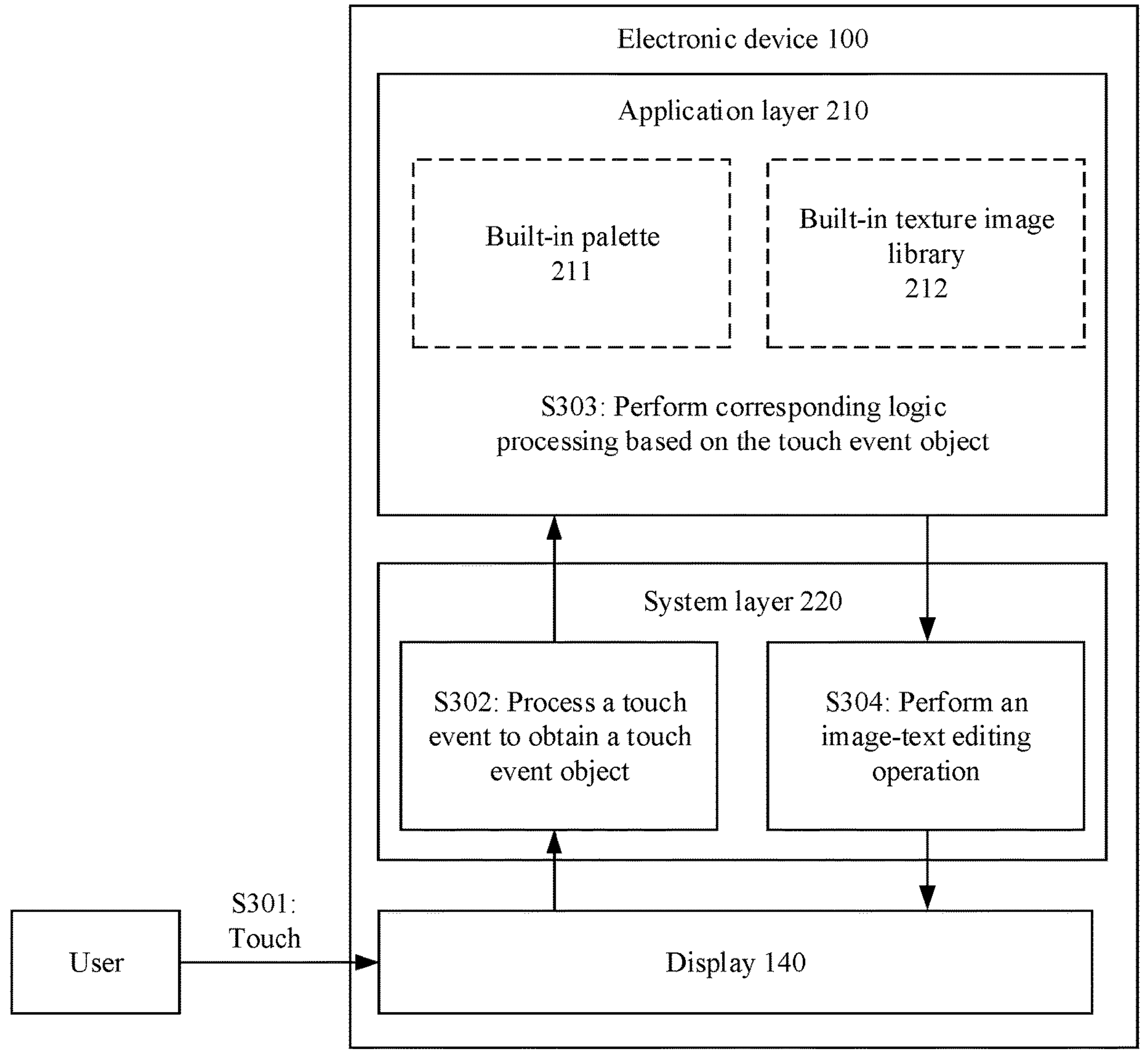
FIG. 3 is a flowchart of an image-text editing method according to an embodiment of this application.

FIG. 3 is a flowchart of an image-text editing method according to an embodiment of this application.

S301. A user touches the display 140 of the electronic device 100.

The user may touch the display 140 of the electronic device 100 by using a body part or a stylus, to interact with the electronic device 100, for example, select a text area or an image area to be colored or to draw a texture in.

S302: The electronic device 100 processes a touch event by using the system layer 220, to obtain a touch event object.

The electronic device 100 may process the touch event by using the system layer 220, encapsulate coordinates and a pressure value of the touch event into the touch event object, and provide the touch event object to the application layer 210.

S303: The electronic device 100 performs corresponding logic processing based on the touch event object by using the application layer 210.

After the touch event object is obtained, an image-text editing application (for example, a drawing application or a document application) of the application layer 210 in the electronic device 100 may perform internal logic processing of the application, for example, determine that the user opens the built-in palette 211, determine a color selected by the user in the built-in palette 211, determine that the user opens the built-in texture image library 212, or determine a texture feature selected by the user in the built-in texture image library.

S304: The electronic device 100 performs an image-text editing operation by using the system layer 220.

The electronic device 100 may perform the image-text editing operation by using the system layer 220, and display an image-text editing result on the display 140. An editing operation on an image is used as an example. If coloring is performed on the image, coloring processing may be performed on the image based on a color feature determined from the built-in palette 211. If texture drawing is performed on the image, a corresponding texture may be drawn based on a texture feature determined from the built-in texture image library 212.

It can be learned that, in a process of implementing the foregoing image-text editing method, the electronic device can provide the color feature for the user only by using the built-in palette, and provide the texture feature for the user only by using the built-in texture image feature library. Because image feature libraries such as the built-in palette and the built-in texture image feature library are usually preset by a developer of the image-text editing application, image features included in the image feature libraries are quite limited, and it is difficult to meet a user requirement.

To resolve the foregoing technical problem, an embodiment of this application provides an image feature obtaining system and method.

Figure 4:
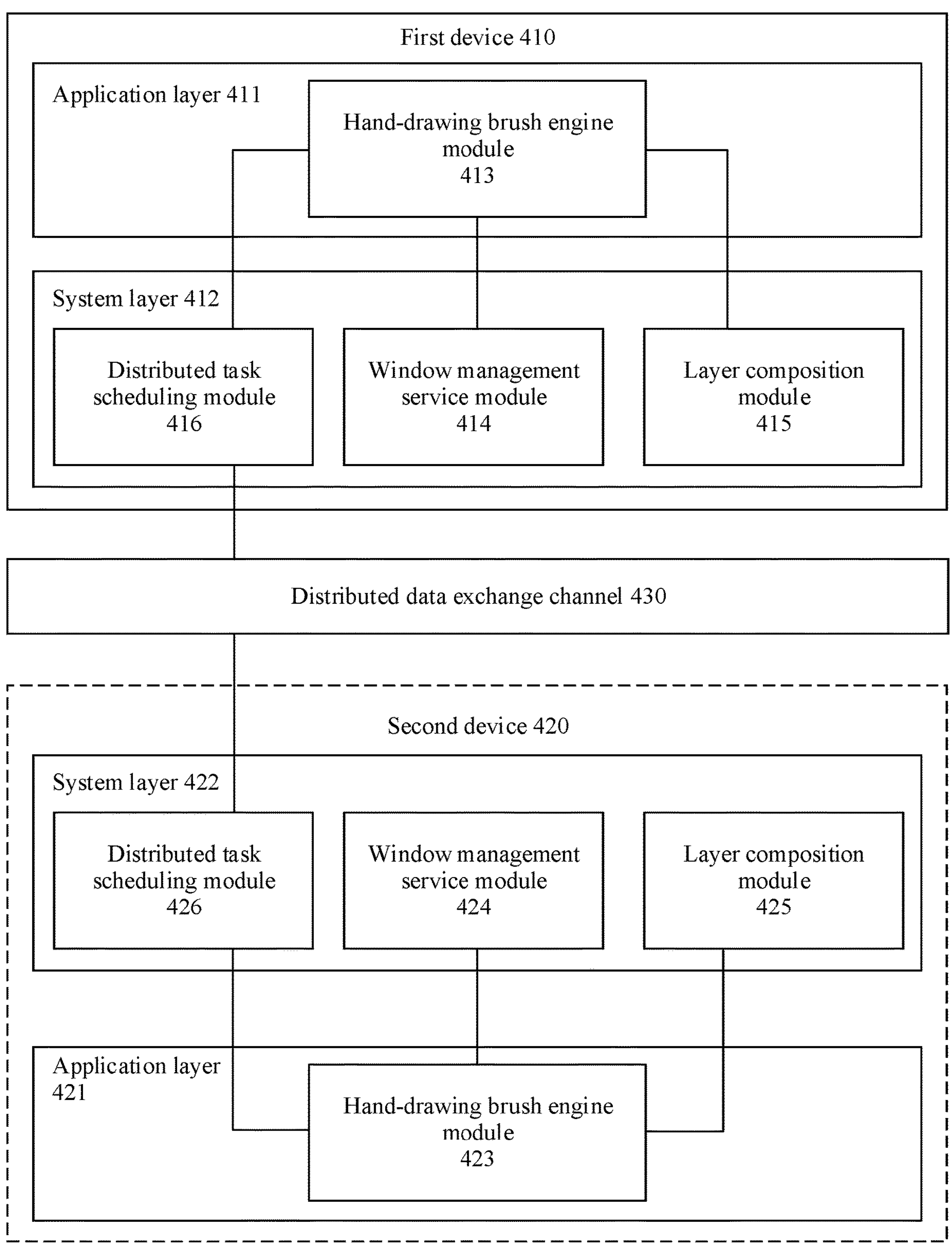
FIG. 4 is a block diagram of an image feature obtaining system according to an embodiment of this application.

FIG. 4 is a block diagram of an image feature obtaining system according to an embodiment of this application. The system may include a first device 410, and may further include a second device 420 associated with the first device 410 and a distributed data exchange channel 430 for data exchange between the first device 410 and the second device 420. That the first device 410 is associated with the second device 420 may mean that the first device 410 is being connected to or can be connected to the second device 420 through communication. In some embodiments, the first device 410 and the second device 420 may be devices currently connected by using a short-range communication technology. In some other embodiments, the first device 410 and the second device 420 may be devices corresponding to a same user identifier. For example, the first device 410 may be a tablet computer of a user A, and the second device 420 may be a mobile phone of the user A.

The first device 410 may include an application layer 411 and a system layer 412. The application layer 411 may include a hand-drawing brush engine module 413. The system layer 412 may include a window management service module 414, a layer composition module 415, and a distributed task scheduling module 416.

The second device 420 may include an application layer 421 and a system layer 422. The application layer 421 may include a hand-drawing brush engine module 423. The system layer 422 may include a window management service module 424, a layer composition module 425, and a distributed task scheduling module 426.

It should be noted that the hand-drawing brush engine module 413, the window management service module 414, the layer composition module 415, and the distributed task scheduling module 416 may be respectively similar to or the same as the hand-drawing brush engine module 213, the window management service module 221, the layer composition module 222, and the distributed task scheduling module 223 in the electronic device 100 in FIG. 2. The hand-drawing brush engine module 423, the window management service module 424, the layer composition module 425, and the distributed task scheduling module 426 may be respectively similar to or the same as the hand-drawing brush engine module 213, the window management service module 221, the layer composition module 222, and the distributed task scheduling module 223 in the electronic device 100 in FIG. 2.

It should be further noted that, when the first device may interact with the user otherwise than by touching, the hand-drawing brush engine module in the first device 410 and/or the hand-drawing brush engine module in the second device 420 may be omitted, and when the first device 410 does not need to obtain an image feature from the second device 420, the distributed task scheduling module 416 in the first device 410 may also be omitted.

It should be further noted that the application layer of the first device 410 and/or the application layer of the second device 420 may also include at least one of a built-in palette and a built-in texture image library.

If the first device 410 receives a first obtaining instruction that indicates to obtain an image feature, the first device 410 may obtain a first feature. The first feature is a feature of a first image of a target device. The target device may be the first device 410 or the second device 420. The first image may be at least a partial image of a picture currently displayed by the target device. Content of the picture displayed by the target device comes from a wide range of sources, and may be an interface of an application in the target device, or may be a superposition of interfaces of a plurality of applications in the target device. For example, the picture may be a frame of picture in a video that is being played in full screen, or may be a list of a plurality of photos included in an album. Therefore, as a part of the picture, the first image is not limited by an application in the first device 410 or the first device 410. Compared with limited color features or texture features that can be provided by the built-in palette or the built-in texture library of an image-text editing application, the first features that may be included in the first image are very flexible and diversified. This greatly improves flexibility and diversity of obtained image features. For example, the user may open a favorite photo on a display of the first device 410, so that the picture currently displayed on the display includes the photo. Then, the first image is obtained, and the first feature is obtained from the first image. To be specific, the image feature can be quickly obtained from the favorite photo of the user. In this way, a user requirement can be fully met.

Specific embodiments are used below to describe in detail the technical solutions of this application. The following several specific embodiments may be combined with each other, and a same or similar concept or process may not be described repeatedly in some embodiments.

Figure 5:
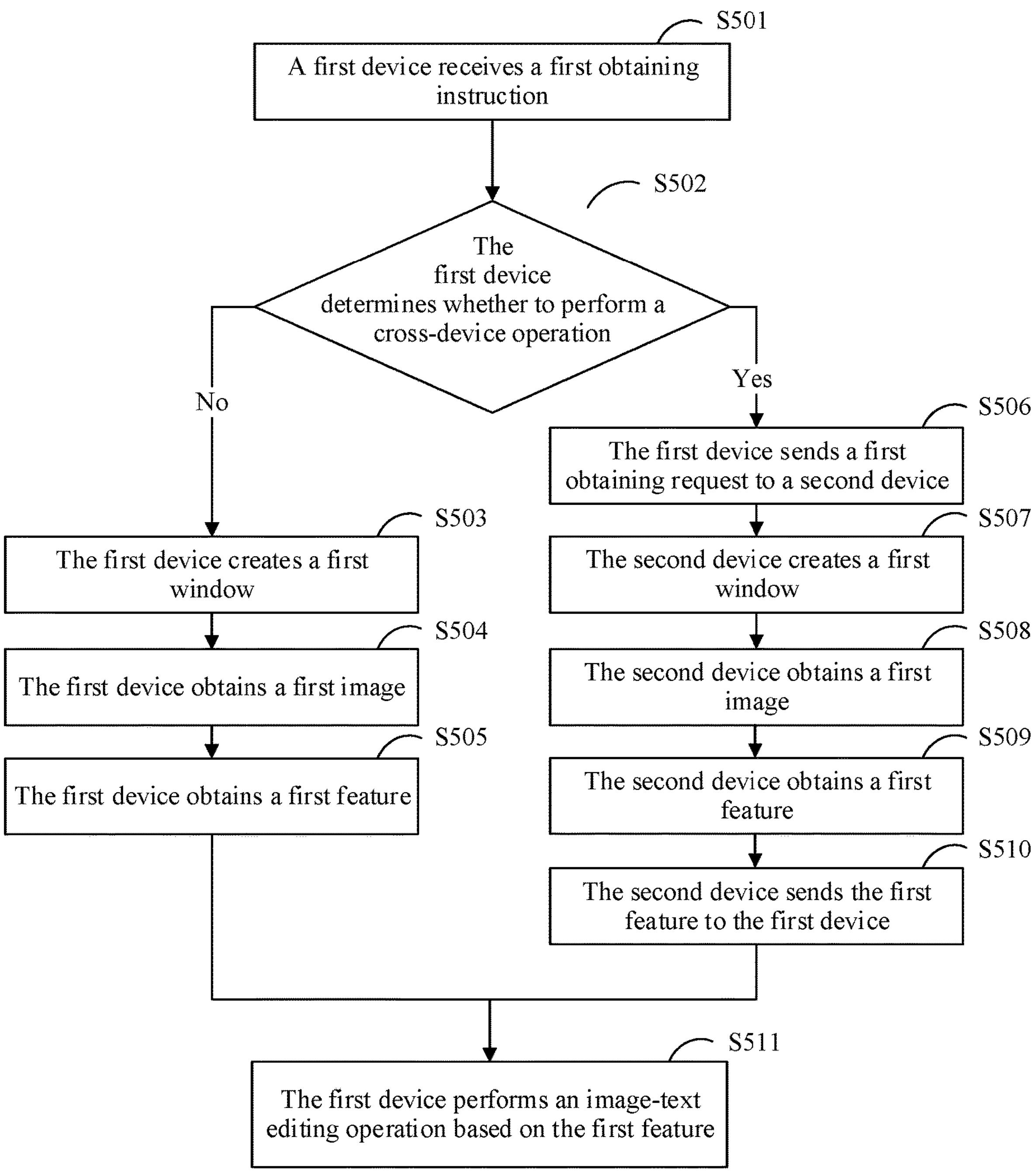
FIG. 5 is a flowchart of an image feature obtaining method according to an embodiment of this application.

FIG. 5 is a flowchart of an image feature obtaining method according to an embodiment of this application. It should be noted that the method is not limited to a specific sequence described in FIG. 5 and the following. It should be understood that, in other embodiments, sequences of some steps in the method may be exchanged according to an actual requirement, or some steps in the method may be omitted or deleted. The method may be applied to the first device or interaction between the first device and the second device in FIG. 4, and includes the following steps.

S501: The first device receives a first obtaining instruction.

The first obtaining instruction indicates the first device to obtain an image feature.

It should be noted that the image feature may be a visual feature of an image, and the image feature may be used to edit a text or an image. When the text or the image is edited based on the image feature, the text or the image may be enabled to have the image feature.

In some embodiments, a feature type of the image feature may include a color type and a texture type. Certainly, in actual application, the feature type of the image feature may further include another feature type, for example, at least one of a shape type and a spatial relationship type.

The first device may provide, for a user through a human-computer interaction interface, a control used to trigger obtaining of the image feature, and receive, based on the control, the first obtaining instruction submitted by the user.

Figure 6:
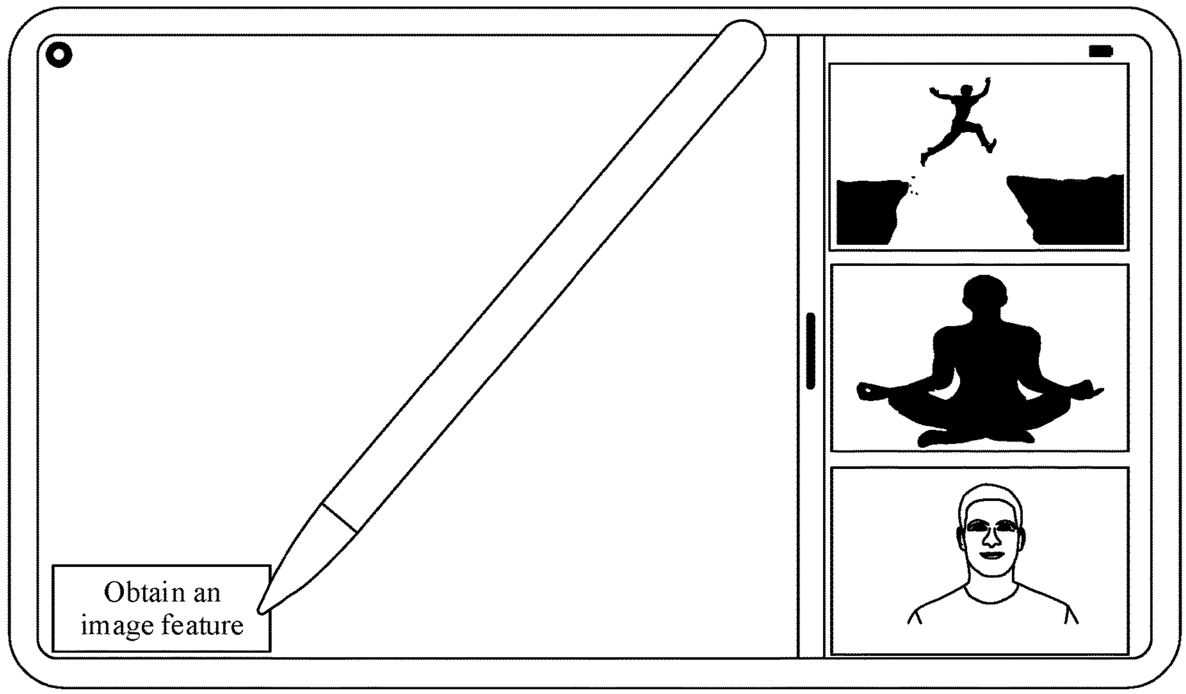
FIG. 6 is a schematic diagram of a display interface of an electronic device according to an embodiment of this application.

In some embodiments, the display of the first device is a touchscreen, and the user may tap or slide on the screen by using a finger or a stylus, to interact with the first device. As shown in FIG. 6, the lower left corner of the first device includes an "Obtain an image feature" button. When receiving a tap operation on the button, the first device may determine that the first obtaining instruction is received.

Figure 7:
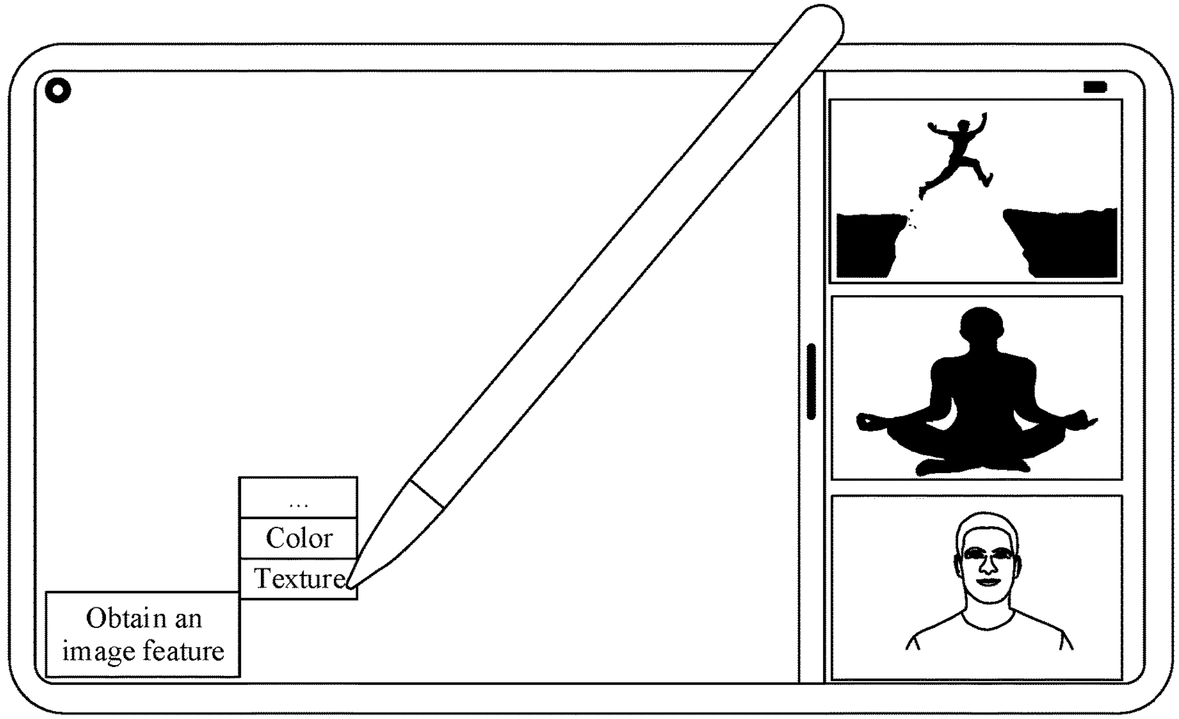
FIG. 7 is a schematic diagram of another display interface of an electronic device according to an embodiment of this application.

In some embodiments, the image feature may include a plurality of feature types. Therefore, to improve accuracy of obtained image features, the first device may receive a third setting instruction submitted by the user, where the third setting instruction indicates a target feature type. In some embodiments, the target feature type may include a color type or a texture type. In some other embodiments, the target feature type may also be carried in the first obtaining instruction. When receiving a tap operation on "Obtain an image feature" in FIG. 6, the first device may continue to provide, for the user, a second-level menu used to determine a feature type, as shown in FIG. 7. The second-level menu includes a plurality of to-be-selected feature types. When receiving a tap operation by the user on any feature type, the first device determines that the feature type is the target feature type selected by the user.

In some embodiments, to enable the user to obtain an image feature from another electronic device and apply the image feature to the first device, and further broaden the scope of and improve flexibility of obtained image features, the first device may receive a first setting instruction or a second setting instruction submitted by the user. The first setting instruction may carry a device identifier of the first device, and indicates that a target device for obtaining the image feature is the first device. The second setting instruction may carry a device identifier of the second device, and indicates that the target device for obtaining the image feature is the second device. In some other embodiments, the device identifier of the first device or the device identifier of the second device may also be carried in the first obtaining instruction. When receiving the tap operation by the user on "Obtain an image feature" in FIG. 6, or when determining, based on the second-level menu shown in FIG. 7, the target feature type selected by the user, the first device may continue to display a device selection interface shown in FIG. 8. The device selection interface includes at least one device identifier. When receiving a tap operation by the user on any device identifier, the first device may determine that an electronic device corresponding to the device identifier is the target device. For example, when receiving a tap operation on the device identifier of the first device, the first device may determine that the first setting instruction is received, and that the first device is the target device. When receiving a tap operation on the device identifier of the second device, the first device may determine that the second setting instruction is received, and that the second device is the target device.

The second device may be a device associated with the first device.

It should be noted that, to provide a more personalized image feature obtaining manner for the user, and further improve flexibility and accuracy of obtained images, in actual application, the first device may receive more other indication information that indicates the image feature obtaining manner. The indication information may be separately indicated by a separate setting instruction, or may be carried in the first obtaining instruction.

It should be further noted that a manner in which the first device receives the indication information that indicates the image feature obtaining manner is not specifically limited in embodiments of this application.

S502: The first device determines whether to obtain the image feature in a cross-device manner. If in the cross-device manner, S506 is performed. If not in the cross-device manner, S503 is performed.

To determine whether the image feature is subsequently obtained from a local end or another device, so as to use a corresponding obtaining method, the first device may determine whether to obtain the image feature in the cross-device manner.

In some embodiments, if the first device does not receive any device identifier submitted by the user, or a device identifier submitted by the user and received by the first device is the device identifier of the first device, the first device may determine to obtain the image feature in the cross-device manner. Correspondingly, if a device identifier submitted by the user and received by the first device is not the device identifier of the first device, the first device determines to extract the image feature in the cross-device manner from the second device corresponding to the received device identifier.

In some embodiments, the first device may determine whether the first setting instruction, the second setting instruction, or the first obtaining instruction carries the device identifier. If the first setting instruction or the first obtaining instruction does not carry any device identifier or carries the device identifier of the first device, it may be determined not to extract the image feature in the cross-device manner. If the second setting instruction or the first obtaining instruction carries a device identifier, and the device identifier is not the device identifier of the first device, the image feature is to be extracted, in the cross-device manner, from the second device corresponding to the received device identifier.

It should be noted that, in actual application, the first device may also be configured to obtain the image feature only from the local end or obtain the image feature only from the second device. Therefore, S502 may not be performed, that is, S502 is an optional step.

S503: The first device creates a first window.

Figure 8:
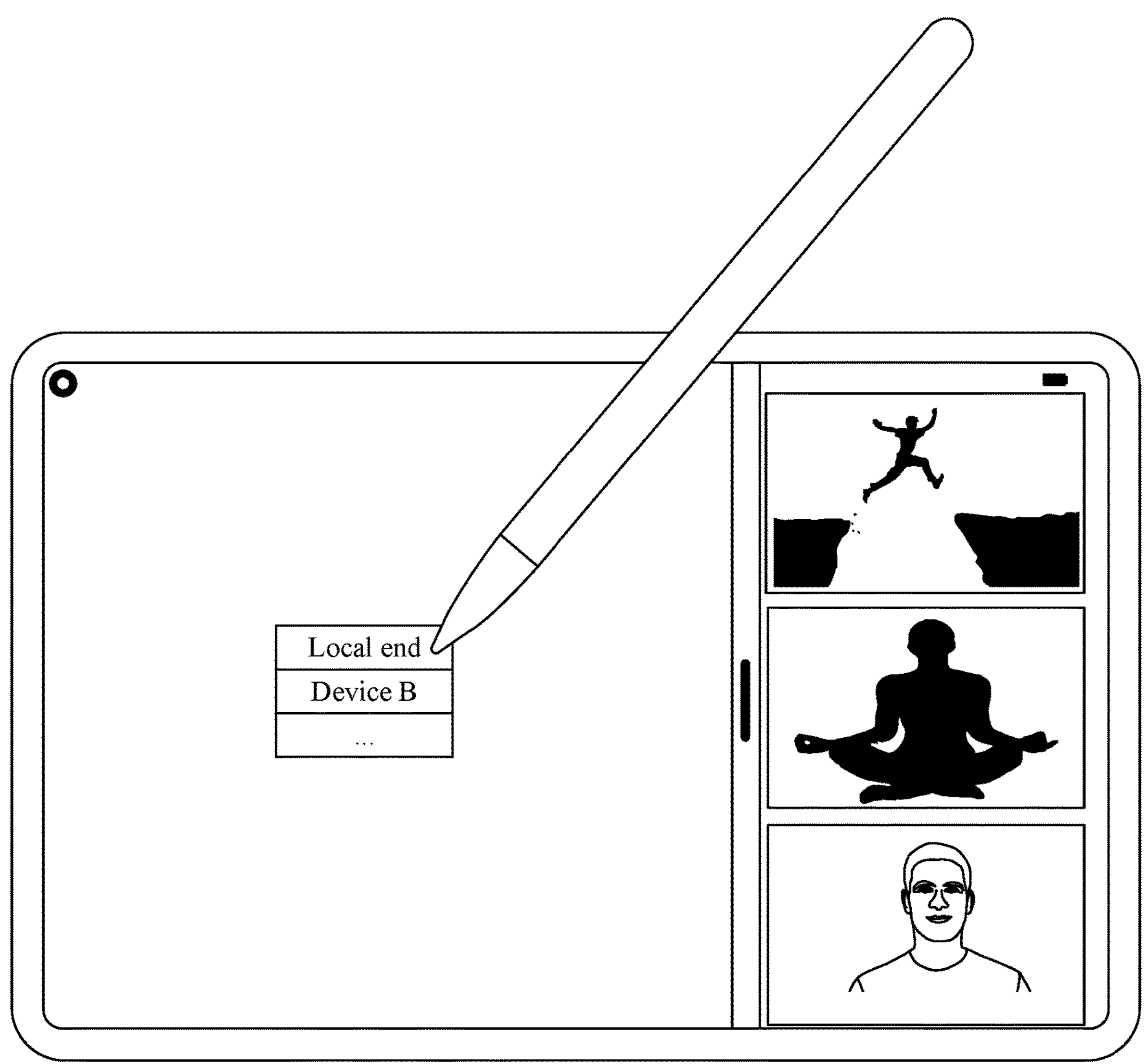
FIG. 8 is a schematic diagram of still another display interface of an electronic device according to an embodiment of this application.

The display of the first device may include a plurality of windows such as a second window and a third window, and the windows may belong to different applications. As shown in FIG. 6 to FIG. 8, a window of a drawing application may be displayed on the left side of the display, and a window of an album may be displayed on the right side of the display. Therefore, to avoid confusion between an operation of obtaining a first image by the first device and another operation (for example, an operation on the album), and improve reliability of obtaining the first image, the first device may create the first window by using the foregoing window management service module.

A size of the first window may be the same as a size of the display of the first device, and the first window is a transparent window located over another window displayed on the display, that is, the first window is a global transparent window located over all applications of the first device.

It should be noted that transparency of the first window may be obtained by the first device by receiving, in advance, a submission by a related person skilled in the art, or may be obtained by receiving a submission by the user before the first window is created.

Optionally, the transparency of the first window may be 100%. Certainly, in actual application, the transparency of the first window may be another value. The transparency of the first window is not specifically limited in embodiments of this application.

Figure 9:
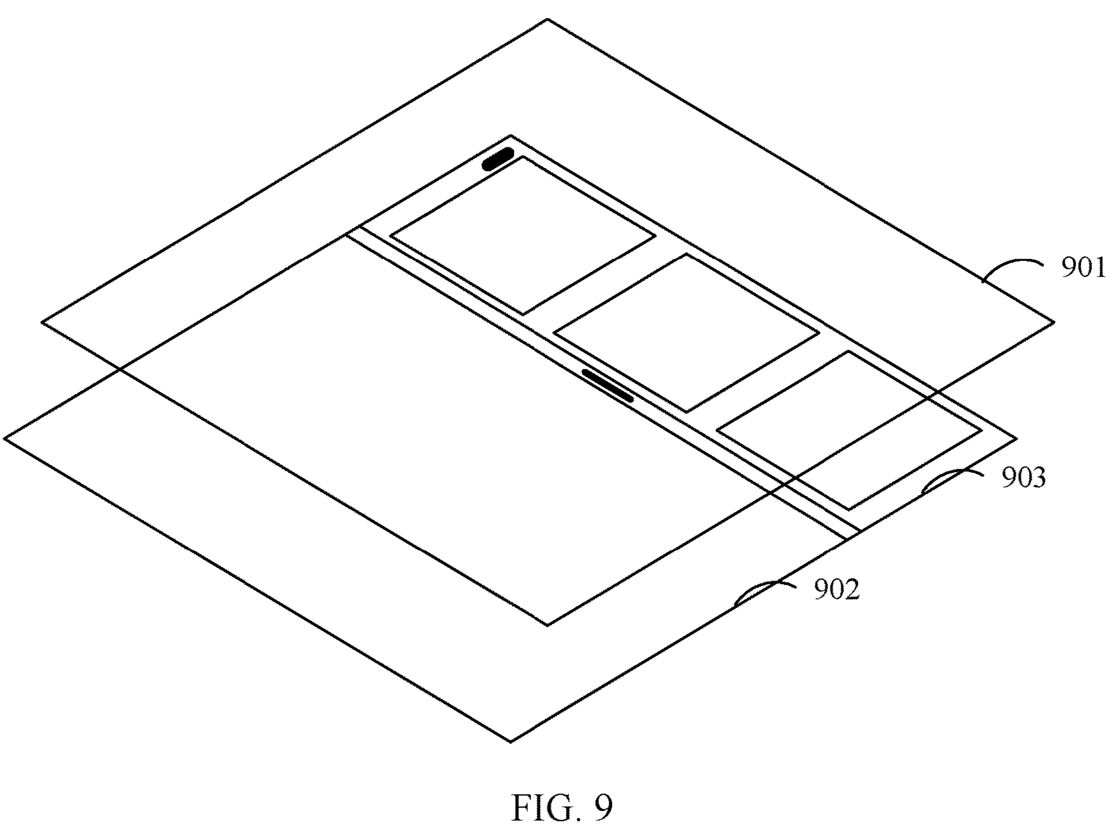
FIG. 9 is a schematic diagram of a display scenario according to an embodiment of this application.

For example, a schematic diagram of a display scenario may be shown in FIG. 9. The scenario includes a first window 901 at a top layer. The first window is a global transparent window and transparency of the first window is 100%, and an original display interface of the first device is located under the first window, and includes a second window 902 and a third window 903. The second window 902 is the window of the drawing application shown in FIG. 6 to FIG. 8, and the third window is the window of the album shown in FIG. 6 to FIG. 8.

It should be noted that, in actual application, the first device may obtain the first image in another manner. Therefore, S503 may not be performed, that is, S503 is an optional step.

S504: The first device obtains the first image.

The first image may be at least a partial image in a picture currently displayed on the display of the first device.

In some embodiments, the first device may obtain, based on a first screen capture operation, the first image from the picture currently displayed on the display of the first device. In some embodiments, when the first device creates the first window, the first device may receive the first screen capture operation on the first window.

In some embodiments, the user may set an area range of the to-be-obtained first image by using the first screen capture operation. The first device may determine a first closed area on the display of the first device based on the first screen capture operation. An image in the first closed area is the first image that the user is to obtain.

In some embodiments, the first screen capture operation may be used to directly determine the first closed area. The first screen capture operation may include a sliding operation. Correspondingly, the first device may determine, as the first closed area, a closed area formed by a sliding track of the sliding operation. In some embodiments, the closed area may be a maximum closed area or a minimum closed area formed by the sliding track. To be specific, the user may flexibly and accurately obtain the first image in any size or any shape by sliding on the display.

Figure 10:
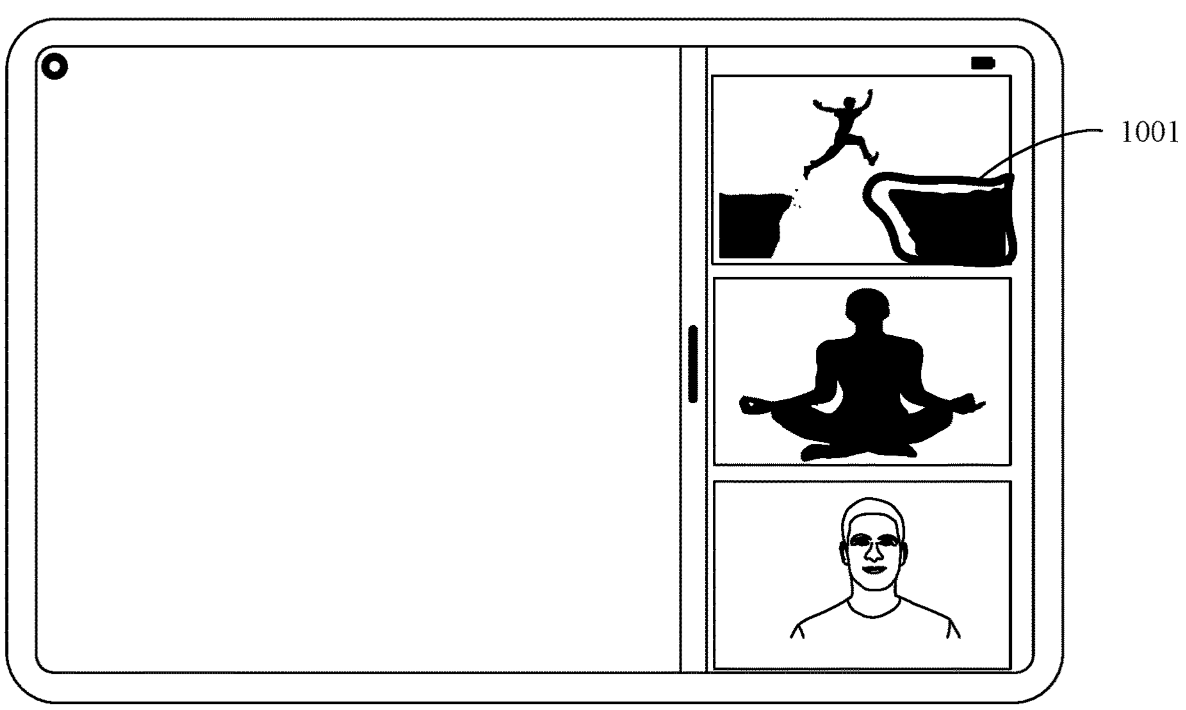
FIG. 10 is a schematic diagram of a first closed area according to an embodiment of this application.

For example, as shown in FIG. 10, a photo on the upper right of the display of the first device includes river banks on two sides and a jumping person on the upper side. The user draws an irregular first closed area 1001 in the lower right corner of the photo by using the stylus, where the first closed area 1001 includes the river bank on the right side.

It should be noted that, if the sliding track of the sliding operation does not form the closed area, the head and the tail of the sliding track may be connected to obtain a closed area.

In some embodiments, the first screen capture operation may be used to determine a first position of the first closed area on the display, and a preset first frame may be used to determine a size and a shape of the first closed area. Correspondingly, the first device may determine the first position based on the first screen capture operation, and determine an area in the first frame at the first position as the first closed area. Because the user does not need to draw the first closed area, difficulty in obtaining the first image can be reduced.

Figure 11:
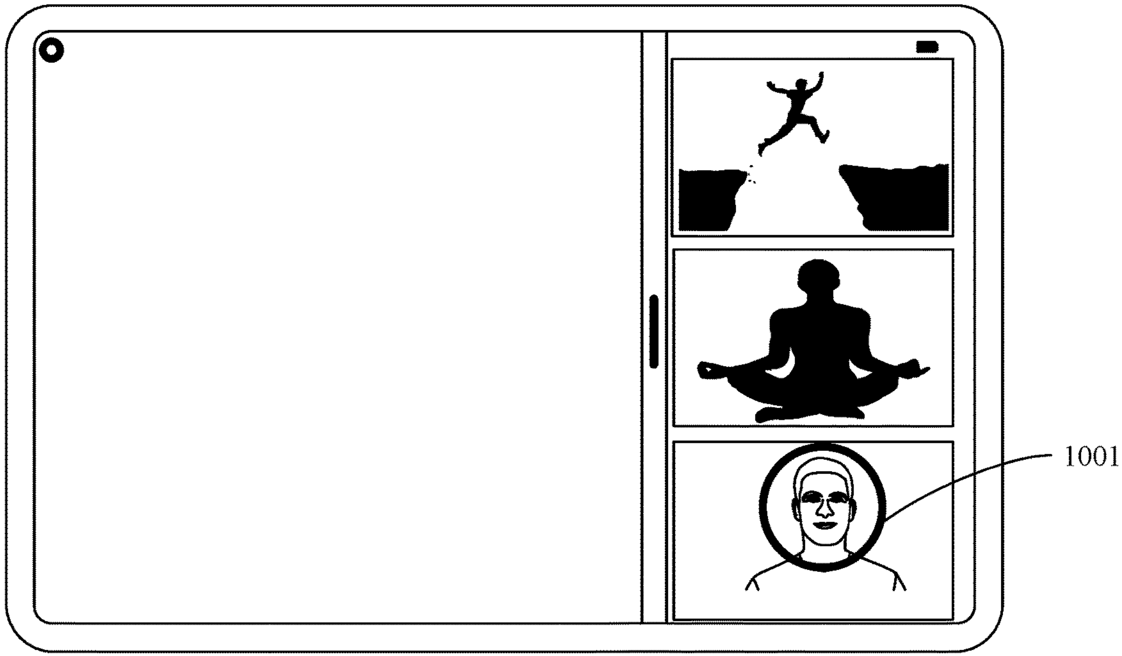
FIG. 11 is a schematic diagram of another first closed area according to an embodiment of this application.

For example, as shown in FIG. 11, the first frame is a circular frame with a diameter of 3 cm. A photo in the lower right corner of the display of the first device includes a half-body photo of a person. The user taps the display or slides on the display. A position of a tapped position or an end point of a sliding track is the first position. The first device generates a circular frame with a diameter of 3 cm at the first position. An area in the circular frame is the first closed area 1001, and the first closed area 1001 includes a portrait of the person.

It should be noted that the first frame (including the size and the shape) may be determined through presetting. In some embodiments, the first device may provide a plurality of different frames for the user in advance, and when receiving a selection operation by the user on any frame, determine the frame as the first frame. The size, the shape, and a setting manner of the first frame are not specifically limited in embodiments of this application.

It should be further noted that, in actual application, the first screen capture operation may alternatively include an operation in another manner, provided that the first closed area can be determined. An operation manner of the first screen capture operation is not specifically limited in embodiments of this application.

After determining the first closed area, the first device may obtain the first image based on the first closed area.

In some embodiments, the first device may capture, as a second image, the picture currently displayed on the display of the first device, and crop the second image based on the first closed area, to obtain the first image. To be specific, the first device may first capture a screen of an entire interface on the display of the first device, and then obtain, through cropping based on the first closed area, the first image from the second image obtained through screen capture.

In some embodiments, the first device may capture the first image in the first closed area from the picture currently displayed on the display of the first device. The first device may determine, based on a position relationship between each window and the first closed area, a picture of at least one window that matches the first closed area, and compose, based on an upper level-lower level relationship between the at least one window, the picture of the at least one window into the first image by using the layer composition module.

It should be noted that the first image is determined based on the first closed area, and may include less image data than the second image, so that data to be analyzed for subsequently extracting a first feature is less and the extracted first feature is more accurate. This can improve efficiency and accuracy of obtaining the first feature. Certainly, in actual application, the second image may also be obtained for subsequently obtaining the first feature.

In some embodiments, if the first device creates the first window before obtaining the first image, the first device may close the first window after obtaining the first image, so that the user can continue to interact with another window subsequently.

S505: The first device obtains the first feature. Then, the first device may perform S511.

After obtaining the first image, the first device may perform analysis processing on the first image, to extract the first feature. The first image is at least a partial image of the picture currently displayed on the display of the first device, the picture is not limited by an application, and correspondingly, the first image is not limited by an application in the first device. Therefore, the first feature can be obtained from a source outside a preset image feature library, for example, an area outside an interface of an image-text editing application. Therefore, flexibility and diversity of obtained image features are improved, and a user requirement can be fully met. In addition, in comparison with a manner in which the user uploads the image feature to the first device from outside the first device, an operation is simpler.

In some embodiments, if the first device obtains, by using the third setting instruction or the first obtaining instruction, the target feature type specified by the user, the first device may process the first image based on the target feature type, to obtain the first feature of the target feature type.

For example, if the feature type carried in the first obtaining instruction is a color type, the first device may perform type analysis on a color of the first image, and the obtained first feature is a feature of the color type, for example, a red green blue (red green blue, RGB) value. If the feature type carried in the first obtaining instruction is a texture type, the first device may perform type analysis on a texture of the first image, and the obtained first feature is a feature of the texture type.

In some embodiments, if the first device does not obtain the feature type specified by the user, the first device may process the first image based on at least one feature type, to obtain at least one type of first feature.

For the color type, the first device may analyze the first image by using a color histogram, a color set, a color moment, a color aggregation vector, a color correlogram, or the like. For the texture type, the first device may analyze the first image by using a statistics method, a geometry method, a model method, a signal processing method, or the like, or may perform blurring, noise reduction, or salt adding on the first image, or the like. For a shape feature, the first device may analyze the first image by using a boundary feature method, a Fourier shape description method, a geometric parameter method, a shape invariant moment method, or the like. For a spatial relationship type, the first device may segment the first image into a plurality of image blocks, then extract a feature of each image block, and establish an index. Certainly, in actual application, the first device may alternatively process the first image in another manner, to obtain the first feature. The manner of obtaining the first feature from the first image is not specifically limited in embodiments of this application.

S506: The first device sends a first obtaining request to the second device.

If the first device determines to obtain the first feature in the cross-device manner, the first device may send, to the second device by using the distributed data exchange channel, the first obtaining request corresponding to the first obtaining instruction, to request the second device to obtain the image feature.

In some embodiments, the first obtaining request may carry the target feature type.

In some embodiments, the first device may establish the distributed data exchange channel with the second device, and exchange data with the second device through the distributed data exchange channel, including sending the first obtaining request to the second device and subsequently receiving data fed back by the second device.

In some embodiments, when receiving the first obtaining request sent by the second device, the second device may display first notification information. The first notification information is used to notify that the first obtaining request of the first device is to be responded to.

Figure 12:
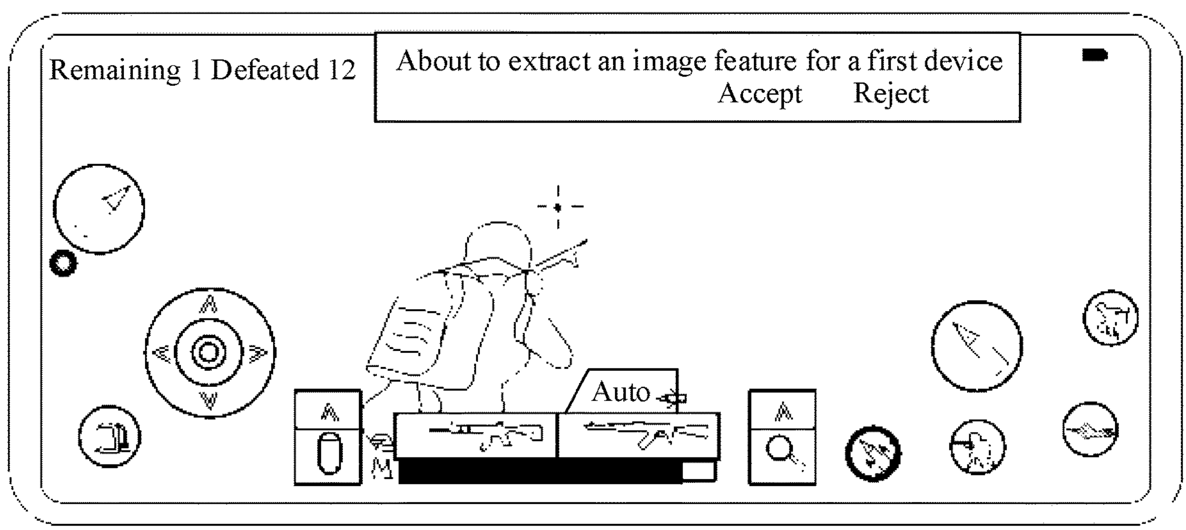
FIG. 12 is a schematic diagram of yet another display interface of an electronic device according to an embodiment of this application.

For example, when receiving the first obtaining request, the second device may display an interface shown in FIG. 12. The top of the interface includes a first notification message, content of the message is "About to extract an image feature for a first device", and the top of the interface further includes an accept button and a reject button. If a tap operation by the user is received on the accept button, the following steps may continue to be performed. If a tap operation by the user is received on the reject button, subsequent operations may be stopped.

In some embodiments, the first device may alternatively send a second obtaining request to the second device. The second obtaining request is used by the second device to obtain the image used to obtain an image feature.

S507: The second device creates a first window.

It should be noted that a manner in which the second device creates the first window may be the same as the manner in which the first device creates the first window in S503. Details are not described herein again.

S508: The second device obtains a first image.

It should be noted that a manner in which the second device obtains the first image may be the same as the manner in which the first device obtains the first image in S504. Details are not described herein again.

S509: The second device obtains a first feature.

It should be noted that a manner in which the second device obtains the first feature may be the same as the manner in which the first device obtains the first feature in S505. Details are not described herein again.

S510: The second device sends the first feature to the first device. Correspondingly, if the first device receives the first feature fed back by the second device, S511 may be performed.

The second device may send the first feature to the first device based on the foregoing distributed data exchange channel.

In some embodiments, if the second device receives the second obtaining request, the second device may not perform S509, and feeds back the first image to the first device in S510. Correspondingly, the first device may perform S505 when receiving the first image, to extract the first feature.

According to S506 to S510, the first device may obtain the first feature from the second device. The first image is at least a partial image in a picture currently displayed on a display of the second device, the picture is not limited by an application, and correspondingly, the first image is not limited by the first device. Therefore, the first device can obtain the first feature from the second device other than the first device. This further improves flexibility and diversity of obtained image features, and fully meets a user requirement. For example, the user may apply a color or texture of a photo in an album of a mobile phone to a drawing application of a tablet computer.

S511: The first device performs an image-text editing operation based on the first feature.

The first device may perform the image-text editing operation in an image-text editing application based on the first feature, to apply the first feature to a new text or image, so that an operated object obtained after the operation has the first feature.

In some embodiments, the first device may bind the first feature to the stylus. If the first device detects a drawing operation by the stylus, the first device sets, as the first feature, an image feature of a text or an image drawn by using the drawing operation.

For example, if the first feature is an RGB value, the first device may bind the RGB value to the stylus. When the user performs drawing by using the stylus, a color of a drawn track is a color indicated by the RGB value. Alternatively, the first feature is a texture feature, and the first device may bind the texture feature to the stylus. When the user performs drawing by using the stylus, a texture feature of a drawn track is the texture feature bound to the stylus.

In some embodiments, the first device or the second device may not obtain the first feature from the first image, but directly copy the first image to the image-text editing application.

It should be noted that, in actual application, after obtaining the first feature, the first device may not perform S511 to immediately apply the first feature, that is, S511 is an optional step. For example, in some embodiments, the first device may add the obtained first feature to an image feature library, for example, a built-in palette or a built-in texture image library, so that the user can directly obtain the first feature from the image feature library, for example, the built-in palette or the built-in texture image library next time.

Certainly, in actual application, the first device may also provide, in a manner similar to that used by the second device, a second feature for a third device associated with the first device.

In some embodiments, the first device may receive a third obtaining request of the third device. The third obtaining request requests to obtain an image feature from the first device. Correspondingly, the first device obtains a third image. The third image may be at least a partial image in the picture currently displayed on the display of the first device. The first device extracts the second feature from the third image, and feeds back the second feature to the third device.

In some embodiments, the first device may receive a fourth obtaining request from the third device. The fourth obtaining request requests to obtain, from the first device, an image used to obtain an image feature. Correspondingly, the first device obtains the third image, and feeds back the third image to the third device. The third device extracts the second feature from the third image.

In embodiments of this application, if the first device receives the first obtaining instruction that indicates to obtain the image feature, the first device may obtain the first feature. The first feature is the feature of the first image of the target device, the target device may be the first device, or may be the second device associated with the first device, and the first image may be at least a partial image of the picture currently displayed on the display of the target device. Content of the picture comes from a wide range of sources, and may be an interface of an application in the target device, or may be a superposition of interfaces of a plurality of applications in the target device. For example, the picture may be a frame of picture in a video that is being played, or may be a list of a plurality of photos included in the album. Therefore, the first image is not limited by an application or the first device, and the first features that may be included in the first image are very flexible and diversified. This greatly improves flexibility and diversity of obtained image features, and fully meets a user requirement.

A person skilled in the art may clearly understand that, for the purpose of convenient and brief description, division into the foregoing functional units or modules is merely used as an example for description. In an actual application, the foregoing functions may be allocated to different functional units or modules for implementation as required. To be specific, an inner structure of the apparatus is divided into different functional units or modules to implement all or some of the functions described above. Functional units and modules in embodiments may be integrated into one processing unit, each of the units may exist alone physically, or two or more units may be integrated into one unit. The integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units or modules in the foregoing system, refer to a corresponding process in the method embodiments. Details are not described herein again.

Figure 13:
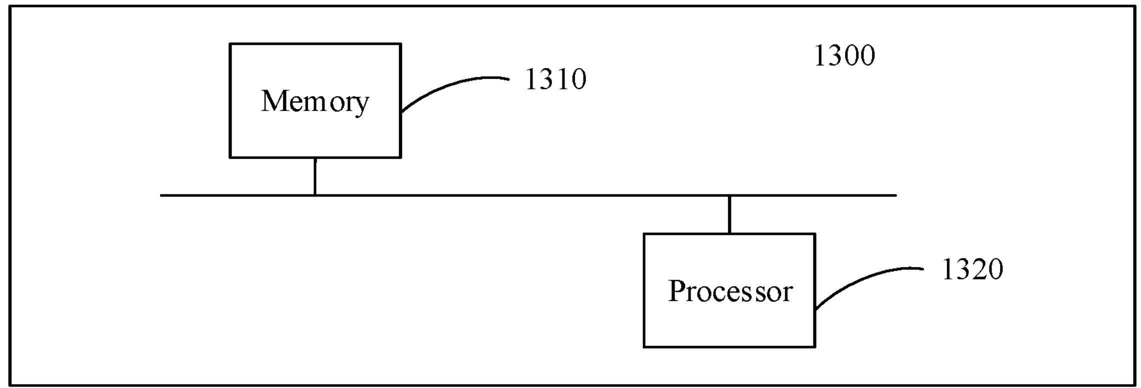
FIG. 13 is a schematic diagram of a structure of an electronic device according to an embodiment of this application.

Based on a same concept, an embodiment of this application further provides an electronic device. The electronic device may be the first device, the second device, or the third device described above. FIG. 13 is a schematic diagram of a structure of an electronic device 1300 according to an embodiment of this application. As shown in FIG. 13, the electronic device provided in embodiments includes a memory 1310 and a processor 1320. The memory 1310 is configured to store a computer program. The processor 1320 is configured to perform the methods described in the foregoing method embodiments when invoking the computer program.

The electronic device provided in embodiments may perform the foregoing method embodiment. An implementation principle and technical effects of the electronic device are similar. Details are not described herein again.

Based on a same inventive idea, an embodiment of this application further provides a chip system. The chip system includes a processor, the processor is coupled to a memory, and the processor executes a computer program stored in the memory, to implement the method in the foregoing method embodiment.

The chip system may be a single chip or a chip module including a plurality of chips.

An embodiment of this application further provides a computer-readable storage medium. The computer-readable storage medium stores a computer program, and when the computer program is executed by a processor, the method in the foregoing method embodiment is implemented.

An embodiment of this application further provides a computer program product. When the computer program product is run on an electronic device, the electronic device is enabled to perform the method in the foregoing method embodiments.

When the foregoing integrated unit is implemented in the form of a software functional unit and sold or used as an independent product, the integrated unit may be stored in a computer-readable storage medium. Based on such an understanding, all or some of the procedures of the method in embodiments of this application may be implemented by a program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable storage medium may include at least: any entity or apparatus that can carry computer program code to a photographing apparatus/a terminal device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be an electrical carrier signal or a telecommunication signal according to legislation and patent practices.

In the foregoing embodiments, the descriptions of all embodiments have respective focuses. For a part that is not described or recorded in detail in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/device and method may be implemented in other manners. For example, the described apparatus/device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "have", and their variants all mean "include but are not limited to", unless otherwise specifically emphasized in another manner.

Finally, it should be noted that the foregoing embodiments are merely intended for describing the technical solutions of this application other than limiting this application. Although this application is described in detail with reference to the foregoing embodiments, a person of ordinary skill in the art should understand that modifications may still be made to the technical solutions described in the foregoing embodiments or equivalent replacements may be made to some or all technical features thereof, without departing from the scope of the technical solutions of embodiments of this application.

The invention claimed is:

1. A method applied to a communications system comprising a first device and a second device, the method comprising:

receiving, by the second device from the first device, a first obtaining request that requests to obtain an image feature from the second device;

creating, by the second device in response to the first obtaining request, a first window having a same size as a size of a display of the second device, with the first window being a global transparent window located over all applications displayed on the display of the second device;

obtaining, by the second device, a first image in a first closed area determined based on a first screen capture operation by a stylus on the first window;

analyzing, by the second device, the first image in the first closed area to obtain a first feature of a detected color of the first image;

closing, by the second device, the first window after the second device obtains the first image;

receiving, by the first device, the first feature of the detected color of the first image via a data exchange channel between the first device and the second device; and performing, by the first device, an image editing operation based on the first feature of the detected color of the first image and an operation by the stylus on a display of the first device.

2. The method of claim 1, wherein the screen capture operation comprises a sliding operation by the stylus, wherein the obtaining, by the second device, the first image further comprises:

obtaining, by the second device, the first image according to the first closed area formed by the sliding operation by the stylus.

3. The method of claim 1, the method further comprising:

receiving, by the first device, an obtaining instruction that is used to instruct the first device to obtain the image feature of a color type; and in response to the obtaining instruction, obtaining, by the first device, the first feature indicating the color type from the second device.

4. The method of claim 1, wherein the image editing operation comprises a drawing operation by the stylus, and the method further comprises:

binding, by the first device, a color feature to the stylus; and displaying, by the first device, a drawn track in response to the drawing operation of the stylus, wherein a color of the drawn track is a color indicated by the color feature.

5. The method of claim 1, the method further comprising:

adding, by the first device, the first feature of the detected color to a built-in palette.

6. The method of claim 1, wherein the first obtaining request indicates a color type to request the image feature of the color type.

7. The method of claim 1, wherein the first feature of the first image is a red green blue (RGB) value.

8. The method of claim 1, wherein the analyzing, by the second device, the first image in the first closed area comprises:

analyzing, by the second device, the first image in the first closed area to obtain the first feature of the detected color of the first image and a text feature of the first image; and the performing, by the first device, the image editing operation comprises:

performing, by the first device, an image-text editing operation of an image-text application based on the first feature of the detected color and the text feature.

9. A second device, comprising:

at least one processor; and at least one memory comprising computer program instructions that, when executed by the at least one processor, cause the second device to perform operations including:

receiving, by the second device from a first device, a first obtaining request that requests to obtain an image feature from the second device;

creating, by the second device in response to the first obtaining request, a first window having a same size as a size of a display of the second device, with the first window being a global transparent window located over all applications displayed on the display of the second device;

obtaining, by the second device, a first image in a first closed area determined based on a first screen capture operation by a stylus on the first window;

analyzing, by the second device, the first image in the first closed area to obtain a first feature of a detected color of the first image;

closing, by the second device, the first window after the second device obtains the first image; and sending, to the first device, the first feature of a detected color of the first image via a data exchange channel between the first device and the second device.

10. The second device of claim 9, wherein the first obtaining request indicates a texture type and a color type; and the analyzing, by the second device, the first image in the first closed area comprises:

analyzing, by the second device, the first image in the first closed area to obtain the first feature of the detected color of the first image and a text feature of the first image, the first feature of the detected color of the first image and the text feature of the first image being sent to the first device for an image-text editing operation of an image-text application on the first device.

11. A system, comprising a first device and a second device, wherein the second device is configured to:

receive, from the first device, a first obtaining request that requests to obtain an image feature from the second device;

create, in response to the first obtaining request, a first window having a same size as a size of a display of the second device, with the first window being a global transparent window located over all applications displayed on the display of the second device;

obtain a first image in a first closed area determined based on a first screen capture operation by a stylus on the first window;

analyze the first image in the first closed area to obtain a first feature of a detected color of the first image;

close the first window after the second device obtains the first image; and send the first feature of the detected color of the first image to the first device via a data exchange channel between the first device and the second device; and the first device is configured to:

receive the first feature of the detected color of the first image via the data exchange channel; and perform an image editing operation based on the first feature of the detected color of the first image and an operation by the stylus on a display of the first device.

12. The system of claim 11, wherein the first obtaining request indicates a texture type and a color type; and the analyze the first image in the first closed area is further configured to:

analyze the first image in the first closed area to obtain the first feature of the detected color of the first image and a text feature of the first image, the text feature of the first image and the first feature of the detected color of the first image being sent to the first device for an image-text editing operation of an image-text application on the first device.

13. The system of claim 11, wherein the image editing operation comprises a drawing operation by the stylus, and the first device is further configured to:

bind a color feature to the stylus; and display a drawn track in response to the drawing operation of the stylus, wherein a color of the drawn track is a color indicated by the color feature.

* * * * *